US007345574B2

(12) United States Patent
Fitzgibbon

(10) Patent No.: US 7,345,574 B2
(45) Date of Patent: Mar. 18, 2008

(54) IMAGE RECOGNITION FACILITATED MOVABLE BARRIER OPERATIONS METHOD AND APPARATUS

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 439 days.

(21) Appl. No.: 10/767,184

(22) Filed: Jan. 29, 2004

(65) Prior Publication Data

US 2005/0168321 A1 Aug. 4, 2005

(51) Int. Cl.
*H04Q 9/00* (2006.01)
*G06K 9/00* (2006.01)

(52) U.S. Cl. .................... 340/5.71; 340/5.52; 340/5.7; 340/5.64; 340/5.53; 382/115

(58) Field of Classification Search .............. 340/5.53, 340/5.7, 5.64, 5.52, 5.71; 382/115
See application file for complete search history.

(56) References Cited

U.S. PATENT DOCUMENTS 6,041,410 A * 3/2000 Hsu et al. .................. 713/186
6,100,811 A * 8/2000 Hsu et al. .................. 340/5.83
6,111,977 A * 8/2000 Scott et al. ................ 382/124
6,747,687 B1 * 6/2004 Alves ......................... 348/148
6,791,467 B1 * 9/2004 Ben-Ze'ev ............. 340/825.69
6,891,467 B2 * 5/2005 Perttunen et al. ...... 340/426.17
6,980,672 B2 * 12/2005 Saito et al. ................. 382/124
7,039,812 B2 * 5/2006 Kawan et al. .............. 713/186
7,119,674 B2 * 10/2006 Sefton ........................ 340/521
7,183,895 B2 * 2/2007 Bazakos et al. ............. 340/5.7
2003/0210131 A1 11/2003 Fitzgibbon et al.

FOREIGN PATENT DOCUMENTS

EP 1026354 11/2004
WO WO 03/036569 5/2003

OTHER PUBLICATIONS

Search Report for Application No. GB0501820.5, issued Apr. 11, 2005.

* cited by examiner

*Primary Examiner*—Brian Zimmerman
*Assistant Examiner*—Scott Au
(74) *Attorney, Agent, or Firm*—Fitch, Even, Tabin & Flannery

(57) ABSTRACT

A movable barrier operator system (10) having a movable barrier operator (11) and a wireless remote control (13) also has an automatic image recognizer (14) operably coupled to at least one of the preceding elements. In a preferred embodiment this automatic image recognizer comprises one or more image capture device (15). So configured, automated operational control decisions can be predicated, at least in part, on image-based information regarding a likely relative position of the wireless remote control with respect to the movable barrier operator.

109 Claims, 3 Drawing Sheets

IMAGE RECOGNITION FACILITATED MOVABLE BARRIER OPERATIONS METHOD AND APPARATUS

TECHNICAL FIELD

This invention relates generally to movable barrier systems.

BACKGROUND

Movable barriers of various kinds are known in the art, including barriers that pivot and/or move vertically or horizontally. Many such movable barriers can be selectively moved by a movable barrier operator. Such automated systems exist, for example, for use with various kinds of garage doors, sliding and pivoting gates, cross-arm guards, rolling shutters and so forth. In many cases the movable barrier operator for such a system will respond to a remote user interface. So configured, a user can interact with the remote user interface to cause the latter to transmit a command signal to the movable barrier operator and thereby cause a desired movement of a corresponding movable barrier (and/or some other desired action as may be controlled by the operator).

In many instances such a remote user interface comprises a wireless remote control device. In this case the device communicates with the movable barrier operator using a wireless link of choice. Such a design permits considerable flexibility with respect to the convenient use of such a control device. For example, when the movable barrier operator controls a garage door, the wireless remote control device can be carried in a vehicle. The driver can then conveniently access the wireless remote control device from within the vehicle and selectively cause the garage door to close subsequent to having removed the vehicle from within the garage.

Though affording some convenience, it still remains necessary in such a system to physically locate and appropriately interact with the wireless remote control device in order to effect such a desired closing of the movable barrier. Because such systems also usually have a relatively limited transmission range, it is also usually necessary in such a system to take these actions before the vehicle has moved out of effective communications range of the movable barrier operator receiver (or transceiver). It is therefore possible that a driver will be unable to conveniently effect a desired movement of a movable barrier. When this occurs, it is possible that a garage door will be left open for an extended period of time. This can, in turn, pose a number of problems including a security risk to the contents of the garage and of the attached home as well.

There are also some users who generally desire greater convenience and who wish to be able to rely to a greater extent upon such a system. Such users typically prefer to have operation of the movable barrier be automated to a greater extent. One prior art suggestion has been to provide the movable barrier operator with a transmission capability. Such a movable barrier operator can then transmit a status message from time to time. A wireless remote control device having a corresponding reception capability can detect such a status message and make control decisions based upon such messages. For example, upon determining that the remote control device has moved to at least a predetermined distance from the movable barrier operator, the device can then self-initiate transmission of a remote control signal to the movable barrier operator to cause the latter to close the movable barrier.

At least one problem with such an approach again pertains to the limited transmission range of such systems. The maximum transmission power for such systems tends to be quite low due to applicable regulations requiring the transmitted power to be lower for periodic transmissions. This, in turn, renders the development of an effective and reliable control scheme more challenging.

BRIEF DESCRIPTION OF THE DRAWINGS

The above needs are at least partially met through provision of the image recognition facilitated movable barrier operations method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, either or both of a movable barrier operator and a movable barrier operator wireless remote control are operably coupled to an automatic image recognizer. In a preferred approach this automatic image recognizer comprises at least one image capture device (such as, but not limited to, a digital image capture device). So configured, at least one predetermined image standard regarding a position of a movable object (such as a terrestrial vehicle) with respect to a movable barrier operator can be provided and then compared against a substantially current image to determine an extent to which the images match one another. In response to detection of a sufficient match, one or more actions with respect to the movable barrier operator and/or the wireless remote control device can be automatically initiated.

Pursuant to some embodiments, a user adjustment interface permits a user to modify a threshold that corresponds to a degree of matching between images that the system requires before taking the automated action. Also pursuant to some embodiments, an image capture user interface permits a user to trigger image capture. Such images can be used, for example, to facilitate development of a predetermined image standard for use in evaluating subsequent captured images.

So configured, such a capability can be utilized in a variety of helpful ways and numerous benefits are possible.

As one example, image recognition can be utilized to permit a movable barrier operator to ascertain that a known vehicle is approach the movable barrier operator. The latter can then respond with a status message transmission of greater amplitude and power than is presently permitted (such a scheme will likely remain within regulatory constraints because the average radiated power over time will still remain at or below permitted limits). A receiving wireless remote control device could then respond with an automated open-door command. This is but one example of a potential improvement with many other possibilities being available (many of these possibilities are presented below in the following detailed description).

Figure 1:
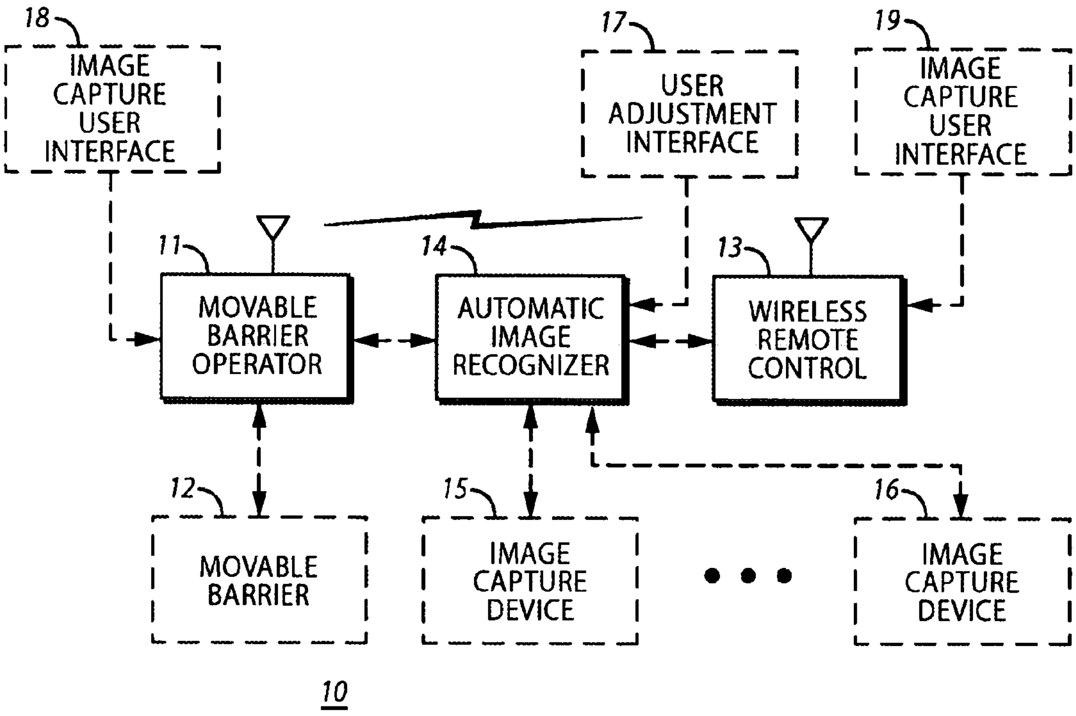
FIG. 1 comprises a block diagram as configured in accordance with various embodiments of the invention.

Referring now to the drawings, and in particular to FIG. 1, an illustrative movable barrier system 10 will preferably comprise a movable barrier operator 11 that operably couples to a movable barrier 12 to effect controlled movement of the latter. Various such operators and barriers are well known in the art and require no further elaboration here save to note that these teachings are beneficially applicable to all manner of such systems including those presently known and likely those developed hereafter.

It will also be noted that the movable barrier operator 11 will preferably comprise a wireless receiver (such as a radio frequency or optical carrier receiver) to permit compatible wireless communications with, for example, a wireless remote control 13. Pursuant to some embodiments, it may also be desirable for the movable barrier operator to also comprise a wireless transmitter to thereby permit transmissions (for example, as directed to the wireless remote control 13). In general, the movable barrier operator 11 will comprise a programmable (or partially programmable) platform that can be readily configured to support the processes and actions set forth below. Of course, if desired, a fixed-purpose platform can be utilized instead.

The wireless remote control 13 will preferably comprise a relatively small device that can be carried on the person or stored or placed conveniently in an automobile. If desired, however, the wireless remote control 13 can be integrally disposed in a larger entity, such as an automobile itself (as when a vehicle's sun visor has a wireless remote control disposed therein). Such a device will usually have at least one user assertable button that a user can assert to cause transmission of a movable barrier operator command (such as an OPEN or CLOSE command).

Such a device may also have a separate LEARN button that can be used to facilitate programming of the wireless remote control 13. Also, in many instances, a wireless remote control 13 may conveniently include multiple remote control transmission buttons in order to afford compatible operation with more than one movable barrier operator. Such a wireless remote control 13 will also typically include a wireless transmitter that operates compatibly with the wireless receiver of the movable barrier operator 11 (and, where appropriate, a wireless receiver to receive wireless transmissions from the movable barrier operator 11). Such wireless remote controls are well known in the art and therefore additional detailed description will not be provided here for the sake of brevity and the preservation of clarity save to note that, again, in a preferred embodiment the wireless remote control may comprise a programmable platform to more easily permit accommodation of these various teachings. Other possible variations are noted below where relevant to the presentation.

Pursuant to a preferred embodiment, an automatic image recognizer 14 operably couples to at least one of the movable barrier operator 11 and the wireless remote control 13. In a typical embodiment, the automatic image recognizer 14 will operably couple to only one of these two system elements though in some embodiments both elements will each operably couple to a separate automatic image recognizer. In general, the automatic image recognizer 14 serves to recognize substantially current images and determine a degree of similarity as between that current image and one or more predetermined image standards. As will be shown below, these images relate generally to respective positions of the movable barrier operator 11 and the wireless remote control 13. By making these image comparisons, a determination can be made regarding a present likely relative position of the wireless remote control 13 with respect to the movable barrier operator 11. This determination, in turn, can serve to facilitate a variety of subsequent automated actions.

Various forms and techniques of image recognition and image comparison are well known in the art and may be used compatibly in support of these teachings. In general, an edge-based recognition approach will likely serve well for these purposes (as versus, for example, an image recognition approach that is highly biased towards facial expression recognition). Such image recognition and comparison engines are usually software based and therefore can be embodied here through provision of a separate processing platform (as suggested by the illustration) or by programming an internal processor of the movable barrier operation device (i.e., the movable barrier operator 11 or the wireless remote control 13) to support such functionality. Such architectural options are well understood by those skilled in the art.

The automatic image recognition process typically requires one or more captured images as input. Accordingly, pursuant to a preferred embodiment, the automatic image recognizer 14 operably couples to an image capture device 15. In a preferred approach, the image capture device 15 will comprise a digital image capture device (in general, a visible light image capture device will likely prove most suitable but other image capture devices may prove useful as well, at least in some settings, such as ultrasonic-based, infrared-based, and radio frequency-based image capture devices, to name a few (when the digital image capture device comprises a non-visible light image capture device, the corresponding automatic image recognizer will of course comprise a non-visible light automatic image recognizer)). Such devices are well known in the art and have recently become both relatively inexpensive and robust in application. Such an image capture device 15 can comprise a stationary platform (which likely comprises a preferred approach for most applications) or can comprise a movable platform (for example, a servo-motor that controls positioning of the image capture device 15 can itself be responsive to movement instructions as sourced, for example, by the movable barrier operator 11, the automatic image recognizer 14, and/or the wireless remote control 13). Depending upon the application context, it may be desirable to employ at least one additional image capture device 16. Such a configuration can potentially permit improved flexibility, timeliness, and/or response time by affording multiple views of a common position or of different positions of interest.

In general, the image capture device (or devices) should be placed as appropriate to afford a propitious view as corresponds to a desired relative position of one movable barrier operations device to another. As one example, when the image capture device operably couples to the movable barrier operator for a garage, the image capture device can be placed to provide a satisfactory view of a driveway that leads up to that garage. In particular, the image capture device can be placed (or otherwise aimed or focused) to provide a useful image of a vehicle in that driveway as that vehicle either leaves or approaches the garage. So positioned, the image capture device can provide an image of a vehicle as that vehicle approaches the garage and that image can be used to ascertain whether the approaching vehicle is likely a known vehicle for which the garage door should be automatically opened.

As another example, when the image capture device is operably coupled to a wireless remote control, the image capture device can be placed to provide a forward-looking view from a vehicle in which the wireless remote control is located. So positioned, the image capture device can provide images of things that the vehicle is approaching. These images, in turn, can be used to automatically recognize when the vehicle is approaching its garage and to cause, for example, an OPEN command to be automatically transmitted to the corresponding movable barrier operator.

As noted above, and as will be elaborated upon in more detail below, the automatic image recognizer serves, at least in part, to compare a substantially current image with a previously stored image (or, perhaps more accurately, characterizing information for each image is compared one against the other). Only rarely could one expect an exact match to occur. Therefore, the automatic image recognizer 14 will preferably ascertain whether the two images are alike enough to warrant a conclusion that they are, in fact, likely a view of the same scene. In a preferred approach a threshold value corresponding to a desired degree of similarity can be used to facilitate this judgment process. It is possible, at least for some applications, that a static factory-set threshold value will be inappropriately low or high during use in a given context. A preferred embodiment will also therefore typically comprise a user adjustment interface 17 (such as an external variable control surface) that a user can use to modify the predetermined threshold to better accommodate present circumstances.

Depending upon the needs of a given application, it may also be helpful to provide an image capture user interface 18 and 19 on either the movable barrier operator 11 or the wireless remote control 13, respectively. So configured, a user can cause an image to be presently captured. Such an image can then be used, as explained below, to facilitate provision of a predetermined image standard that can be used during normal operation as a point of comparison. Such an image capture user interface 18 or 19 can comprise a dedicated button or other assertable element or can share this functionality with another user interface element. For example, an OPEN/CLOSE command button on a wireless remote control can be configured to also source an image capture command, at least under some circumstances (such as during an initial learning mode of operation).

Figure 2:
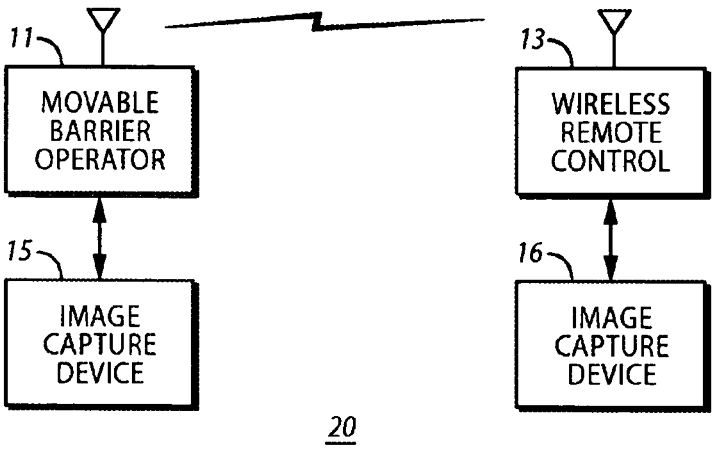
FIG. 2 comprises a block diagram as configured in accordance with an embodiment of the invention.

Referring now to FIG. 2, in some settings it may be preferred to provide both the movable barrier operator 11 and the wireless remote control 13 with a separate respective image capture device 15 and 16. In such an embodiment, an automatic image recognizer can be disposed integral to each of the movable barrier operator 11 and the wireless remote control 13 (or, in the alternative, and presuming sufficient bandwidth capability as between the two system elements, images captured at one of the devices can be transmitted to whichever of the system elements harbors the automatic image recognition engine and functionality) and, of course, either of the system elements 11 and 13 can have additional image capture devices as appropriate. Such a configuration can be used in various helpful ways. For example, both the movable barrier operator 11 and the wireless remote control 13 can make an independent determination of their relative position to one another based upon independent information (i.e., imagery from their respective vantage points) and thereby likely raise the probability of a subsequent automated response being correct.

Figure 3:
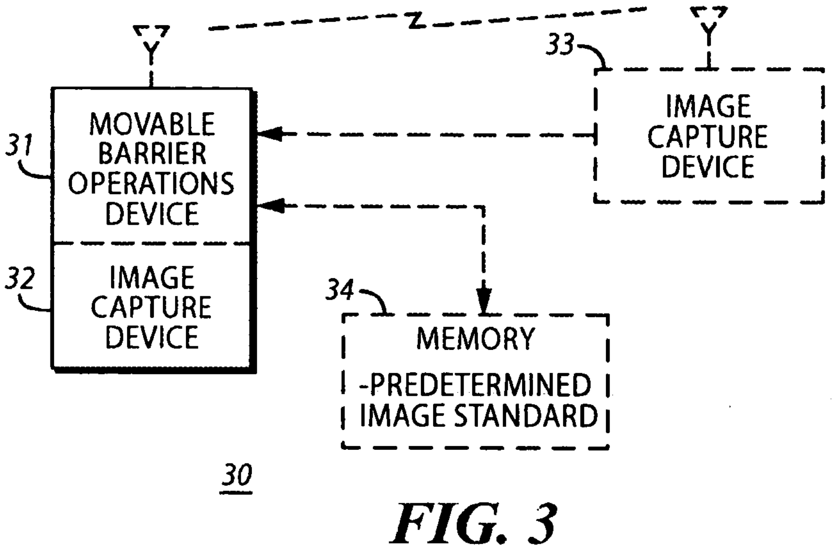
FIG. 3 comprises a block diagram as configured in accordance with various embodiments of the invention.

With reference to FIG. 3, it can be seen that whichever movable barrier operations device 31 (i.e., either the movable barrier operator or the wireless remote control) has an image capture device operably coupled thereto or associated therewith, the image capture device 32 can be disposed integral to the device 31 itself or can be disposed remotely therefrom 33. For example, when disposed integral to the device, the image capture device 32 can be suitably disposed within the housing of the movable barrier operator or the wireless remote control. When disposed integral to a portable wireless remote control, of course, it may be desirable to otherwise provide the latter with a fixed-position cradle to aid in ensuring that the view of the device will be relatively consistent during ordinary use. When the image capture device 33 comprises a remote platform, the latter may couple to the movable barrier operations device 31 by a suitable wireless link (such as a radio frequency or optical carrier based link) or a wireline link (where "wireline" shall be understood to include all manner of non-wireless pathways including electrically conductive and optically bearing pathways). As one illustrative example, when the movable barrier operations device 31 comprises a wireless remote control, the latter can couple via Bluetooth wireless communications to an image capture device 33 disposed at an appropriate location in the user's vehicle.

The movable barrier operations device 31 will typically include some amount of on-board memory. To support these embodiments, however, it may be useful to provide additional memory 34 (either integral to the movable barrier operations device 31 or external thereto) to support the retention of, for example, one or more predetermined image standards for use when comparing with a present image. Various kinds of memory can be so employed, but typically the memory should permit both writing and reading and should preferably comprise a relatively non-volatile retention platform.

Figure 4:
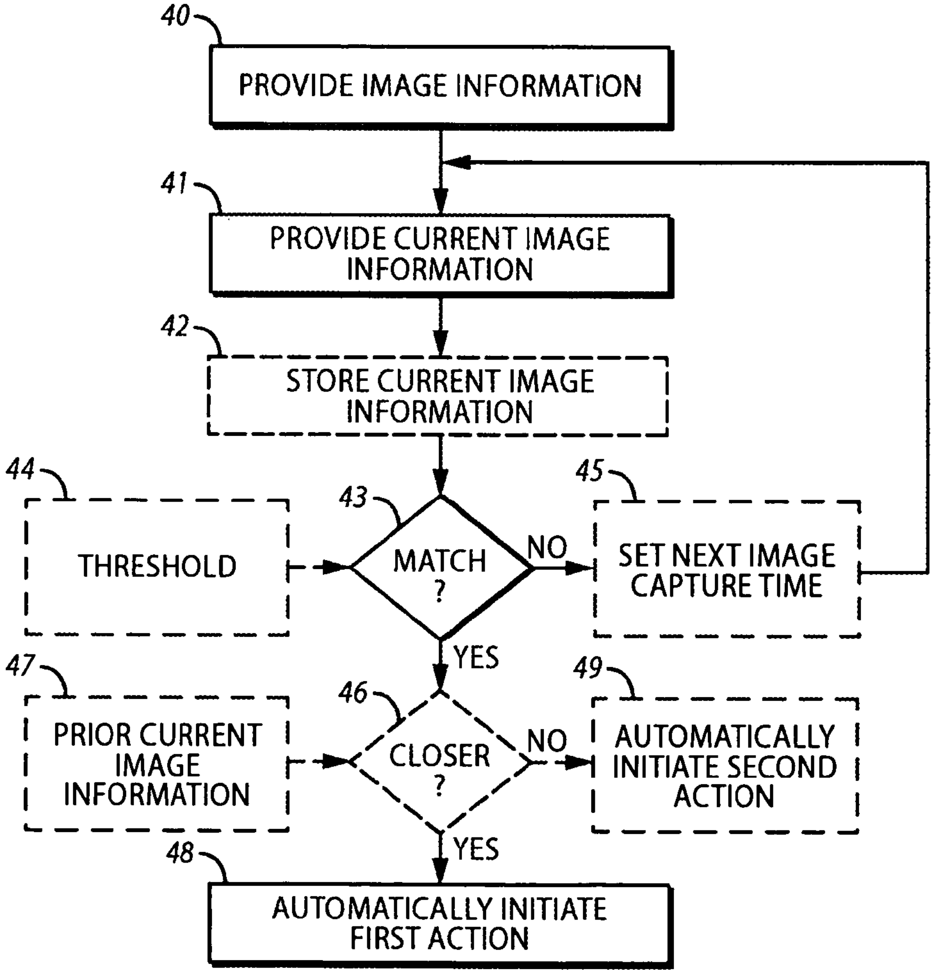
FIG. 4 comprises a general flow diagram as configured in accordance with various embodiments of the invention.
Figure 5:
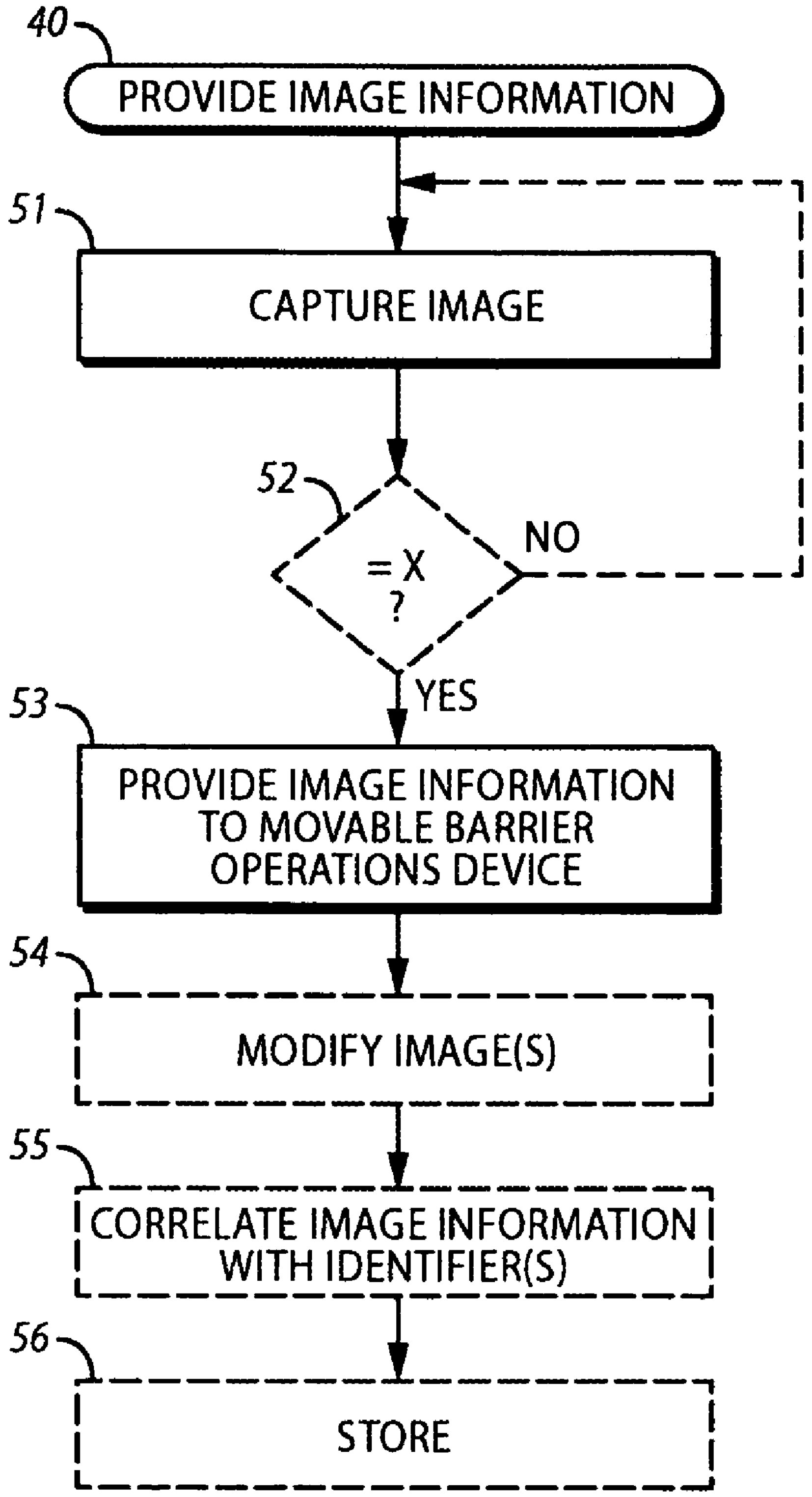
FIG. 5 comprises a detail flow diagram as configured in accordance with various embodiments of the invention.

Such embodiments can be readily used to support the following described processes (though other configurations can also be suitably employed when desired). Referring now to FIG. 4, to support these various embodiments it will ordinarily be helpful to first provide 40 relevant image information. In particular, this image information can comprise at least one predetermined image standard that corresponds to a position of a movable object (such as a terrestrial vehicle) with respect to a movable barrier operator. There are numerous ways to provide such information, and referring momentarily to FIG. 5, some specific approaches will now be described.

First, the process 40 captures 51 a relevant image. In general, this image should correspond to a desired juxtapositioning of the movable barrier operator and the wireless remote control; for example, a particular position of a vehicle in a driveway (or in a roadway that leads to the driveway) that leads to a garage that houses the movable barrier operator. There are various ways to instigate capture of such an image. By one approach, and presuming that an appropriate user interface has been provided as described above, a user can simply force such an image capture event when the movable object occupies an advantageous position. By another approach, such an image capture can occur simultaneously with another, possibly correlated event.

For example, following initial installation (or when otherwise placed into an automatic learning mode of operation), the system can detect when a user asserts a transmit button on the wireless remote control (for example, when the user seeks to cause the movable barrier to move in a desired fashion). Upon detecting this event, the system can respond by capturing the desired image (either substantially simultaneously with the transmit button assertion or following some predetermined delay such as three or five seconds later).

Optionally, additional such images may be captured. For example, up to X 52 such images can be captured during this process. Such multiple images can be spaced by a predetermined amount of time and can be used to provide either a composite information set or can be used as a discrete series of standard images against which subsequent images can be compared. Images captured in rapid succession, of course, will tend to capture images that portray relatively similar positioning of the movable object with respect to the movable barrier operator. Similarly, longer durations between successive image capture events will tend to capture images that portray different relative positioning of the movable object with respect to the movable barrier operator.

Once captured, the image information is provided 53 to the appropriate movable barrier operations device. For example, when a movable barrier operator facilitates the image processing, the captured images are provided to the movable barrier operator. Similarly, when the wireless remote control facilitates the image processing the captured images are provided to the wireless remote control. Other possibilities also exist, of course. For example, images captured by a wireless remote control can be provided to a movable barrier operator. As another example, a movable barrier operator that itself couples to a household network may forward such images to an image processing server of choice. Such approaches may be appropriate when subsequent processing needs likely exceed the computational resources of the source platform.

Optionally, if desired, the captured images may be modified 54. For example, a given image may have been captured on a clear day in full sunlight. Such an image can be filtered or otherwise processed in known ways to mimic and simulate other specific environmental contexts. For example, twilight lighting or cloudy and rainy conditions can be simulated to provide an image that may correspond to how, for example, a given vehicle may appear in a given driveway during a rainstorm. Other kinds of filtering or processing may also be helpful in certain settings. For example, specific color filtering may help to better facilitate the identification of a vehicle having a particular dominant exterior color or of a garage exterior having a particular trim color. When providing modified images, of course, it will be helpful to usually maintain an unmodified version of the image as well.

Depending upon the embodiment, it may also be useful to optionally correlate 55 the captured images and/or image information with a specific identifier. For example, a given movable barrier operator may operate compatibly with two different remote control devices that are each used by the driver of a different vehicle (as can occur with a two-car garage having a single garage door and a single movable barrier operator). When each wireless remote control has a unique identifier, that unique identifier can be correlated with the image information. So configured, a first wireless remote control having a first identifier can be correlated with a first vehicle while a second wireless remote control having a second, different identifier can be correlated with a second, different vehicle. Such an approach can be used to implement various operational strategies. For increased security, for example, it may be required both that the vehicle be recognized by sight and by the identifier code as transmitted by the wireless remote control.

Once suitably captured and processed as desired, the resultant data comprises an image standard and can be stored 56 for subsequent convenient retrieval. As already noted, such storage can occur at the movable barrier operator, at the wireless remote control, or at some remote location to which the processing platform can nevertheless have ready access to retrieve the stored image information.

Referring again to FIG. 4, the process then provides 41 substantially current image information from time to time. This can occur in a variety of ways. For example, the process can simply acquire a new image in a regular and period fashion (such as once every five seconds). When power consumption presents no particular issue, such an approach may prove quite adequate. When power consumption issues are present (as with a portable device), other strategies may be appropriate. For example, when the image capture device is vehicle borne and velocity information can be made available to the image capture controller, image capture may be paused when the vehicle is stationary.

Optionally, such images may be stored 42 for later recall. For example, the most recent 30, or 100, or 10,000 images (or however many images as may be useful to serve a particular need) may all be retained to support later diagnostic or security-related analysis or inquiries. Such multiple images may also be stored to permit scale-based analysis as noted below.

The process then determines 43 whether the substantially current image information matches the at least one predetermined image standard to at least a reasonable degree of certainty. For example, a threshold 44 value can optionally be provided and used to specify an acceptable amount of deviation to nevertheless conclude that a match has occurred. To illustrate, a threshold value of 65% can be provided. This would mean that a current image that matches the standard image with no more than a 35% degree of deviance would be identified as a "match." As already noted above, in an optional approach this threshold value can be rendered variable by a user to thereby permit field modifications to hopefully better correlate the performance of the system with the unique visual circumstances of a given application.

When a match 43 does not occur, the process can optionally schedule 45 a next image capture time. As already noted, this can be determined as a simple function of time. For example, a next image capture event can be scheduled to occur five seconds later. Other approaches can be taken when desired. For example, a record or history can be maintained of the degree of similarity for a sequence of preceding images. To illustrate, if a most recent image comparison evidenced 48% similarity with the standard image, but the image that preceded that image displayed only 31% similarity with the standard image, this apparent increase in similarity may be used to justify an accelerated image capture schedule.

When a match 43 does occur, the process can optionally determine 46 whether the wireless remote control and the movable barrier operator appear to be drawing closer to one another or moving further apart from one another. For example, with use of prior current image information 47 a difference in scale as between otherwise similar images can be used to ascertain such movement to facilitate a specific action. For example, when the two movable barrier operations devices do appear to be drawing closer together, a first action can be automatically initiated 48. Conversely, when such does not appear to be the case, a second action can be automatically initiated 49. For example, the second action can be to simply continue the image capture and comparison process, albeit on a possibly accelerated (or decelerated) basis.

The automatically initiated first action 48 can be any of a wide variety of appropriate responses. For example, a wireless remote control device can be caused to automatically transit a signal, such as a command signal, to a movable barrier operator. So configured, as the vehicle bearing the wireless remote control approaches its corresponding garage, the above described image processing will indicate the imminent approach of the garage door and provide a suitable basis for causing the wireless remote control to issue such a command. This, of course, provides access to the garage for the driver of the vehicle without requiring the vehicle operator to locate and appropriately manipulate the wireless remote control.

Other protocols are possible. For example, the first action automatically taken by a wireless remote control may be to simply transmit a first signal that does not comprise an OPEN command. Upon receiving this first signal, the movable barrier operator could then respond in a predetermined fashion. This could comprise a wireless handshake. As another example, the image processing capability of the wireless remote control can be further leveraged by having the movable barrier operator respond with a visual signal. For example, upon receiving the first signal as transmitted by the wireless remote control, the movable barrier operator could flash an exterior light a specific number of time and/or in accord with a particular predetermined timing sequence. The wireless remote control, upon confirming such visual signals via its image processing capability, could then prosecute a secondary course of action. For example, the wireless remote control could then respond with transmission of an OPEN command to the movable barrier operator.

When it is the movable barrier operator that confirms through image processing the approach of the previously identified vehicle, the first action automatically initiated can comprise an automatic opening of the corresponding movable barrier. This, again, will result in an opening of the garage without requiring the vehicle driver to take a specific action. Pursuant to another approach, a properly configured movable barrier operator can instead transmit a message, such as a status message, to the wireless remote control. Such a status message could be used to implement a strategy whereby the wireless remote control automatically instructs the movable barrier operator to open the movable barrier upon determining that the present status of the system comprises a closed barrier.

Other actions are also possible. For example, an image of a recognized vehicle may be stored and retained for some period of time (again to support subsequent diagnostic or security investigations).

In the embodiments just described, the process determines whether one or more given current images sufficiently match one or more standard images. This determination can comprise a complete analysis and comparison of both (or all) images. For various reasons, however, it may be desirable to effect such a determination through use of a series of tiered levels of analysis and/or comparison (to conserve, for example, computational resources or power). For example, when the standard image comprises a view of a red vehicle, an initial determination can be made as to whether a given current image has a requisite quantity of the color red. When false, no further inquiry need be made. When true, a next level of comparative inquiry can be applied (for example, to test for shape, size, or relative color location similarity) and so forth. There is no particular limit as to the number of comparative or testing tiers that one might usefully apply in this way.

So configured, it will be appreciated that these various embodiments well support an integrated usage of image capture and recognition methodologies and platforms with movable barrier systems. These embodiments support both stand-alone usage (where the image processing supports independent and automatic actions) and integrated usage with other control strategies (such as when the image processing supplements and supports a status signal transmission approach).

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one illustration, a single wireless remote control can be correlated to a plurality of movable objects. To facilitate this, it may be helpful to have a learning mode where multiple images as correspond to each of the different movable objects are captured and then each correlated to the one wireless remote control.

As another illustration, such a system could be configured to learn from false triggering events. For example, a user input could be provided on either or both of the movable barrier operator and the remote control to permit a user to signal that a given response by either of the movable barrier operator or the remote control was inappropriate. The system could then refer to the image (or images) that served as the predicate to the inappropriate action and use that image information to inform subsequent analysis and/or behavior. Pursuant to one approach, such an image could be used to modify the predetermined image standard (or standards) to permit greater differentiation as between a correct triggering image and the incorrect image(s) that caused the false triggering. Pursuant to another approach, the false triggering image can be retained and used in future analysis to determine whether a given current image appears more like the image standard or like the false triggering image.

I claim:

1. An apparatus comprising:

a movable barrier operator;

a movable barrier operator wireless remote control;

an automatic image recognizer operably coupled to at least one of the movable barrier operator and the movable barrier operator wireless remote control, the automatic image recognizer obtaining at least one image representative of an environment of a vehicle, the at least one image indicative of whether the vehicle is present in the environment relative to the moveable barrier operator, and the moveable barrier operator responsive to whether the vehicle is present relative to the moveable barrier operator.

2. The apparatus of claim 1 wherein the automatic image recognizer operably couples to the movable barrier operator.

3. The apparatus of claim 1 wherein the automatic image recognizer operably couples to the movable barrier operator wireless remote control.

4. The apparatus of claim 1 wherein the automatic image recognizer comprises an image capture device which captures an image from the vehicle.

5. The apparatus of claim 4 wherein the image capture device comprises a digital image capture device.

6. The apparatus of claim 4 wherein the image capture device is integrally disposed with respect to the movable barrier operator wireless remote control.

7. The apparatus of claim 4 wherein the image capture device is remotely disposed with respect to the movable barrier operator wireless remote control.

8. The apparatus of claim 7 wherein the image capture device is operably coupled to the movable barrier operator wireless remote control by a wireless link.

9. The apparatus of claim 4 wherein the image capture device is responsive to movement instructions as sourced by the movable barrier operator.

10. The apparatus of claim 4 wherein the automatic image recognizer comprises a plurality of image capture devices.

11. The apparatus of claim 10 wherein at least one of the plurality of image capture devices is operably coupled to the movable barrier operator and another of the plurality of image capture devices is operably coupled to the movable barrier operator wireless remote control.

12. The apparatus of claim 10 wherein at least two of the plurality of image capture devices are each operably coupled to the movable barrier operator.

13. The apparatus of claim 1 wherein the image capture device is remotely disposed from the vehicle.

14. The apparatus of claim 13 wherein the image capture device is operably coupled to the movable barrier operator by a wireless link.

15. The apparatus of claim 13 wherein the image capture device is operably coupled to the movable barrier operator by a wireline link.

16. The apparatus of claim 13 wherein the image capture device comprises a stationary platform.

17. The apparatus of claim 13 wherein the automatic image recognizer comprises a plurality of image capture devices and at least two of the plurality of image capture devices are each operably coupled to the movable barrier operator wireless remote control.

18. The apparatus of claim 1 wherein the automatic image recognizer further comprises image recognition means for recognizing a substantially current image as matching information that corresponds to a predetermined image standard by at least a predetermined threshold.

19. The apparatus of claim 18 wherein the automatic image recognizer further comprises a user adjustment interface such that a user can modify the predetermined threshold.

20. The apparatus of claim 1 wherein at least one of the movable barrier operator and the movable barrier operator wireless remote control have an image capture user interface such that a user can cause capture of at least one image to be used to facilitate provision of the predetermined image standard.

21. The apparatus of claim 1 wherein at least one of the movable barrier operator and the movable barrier operator wireless remote control further comprises a memory that contains information corresponding to at least one predetermined image standard.

22. The apparatus of claim 1 wherein the automatic image recognizer comprises a visible light automatic image recognizer.

23. The apparatus of claim 1 wherein the automatic image recognizer comprises a non-visible light automatic image recognizer.

24. A method comprising:

providing information that corresponds to at least one predetermined image standard representative of an environment of a vehicle with respect to a movable barrier operator, the predetermined image standard indicative of whether the vehicle is present relative to the moveable barrier operator;

providing information that corresponds to a substantially current image;

determining whether at least some information in the substantially current image matches information in the at least one predetermined image standard by at least a predetermined threshold to provide a match detected signal; and in response to the match detected signal, automatically initiating an action at at least one of a movable barrier operator and a movable barrier operator wireless remote control.

25. The method of claim 24 wherein providing information that corresponds to at least one predetermined image standard regarding the environment of the vehicle with respect to a movable barrier operator further comprises capturing an image and providing the image to the movable barrier operator.

26. The method of claim 24 wherein providing information that corresponds to at least one predetermined image standard regarding the environment of the vehicle with respect to a movable barrier operator further comprises capturing an image and providing the image to the movable barrier operator wireless remote control.

27. The method of claim 24 wherein providing information that corresponds to at least one predetermined image standard regarding the environment of the vehicle with respect to a movable barrier operator further comprises providing information that corresponds to a plurality of predetermined image standards regarding the environment of the vehicle with respect to a movable barrier operator.

28. The method of claim 24 wherein providing information that corresponds to at least one predetermined image standard regarding the environment of the vehicle with respect to a movable barrier operator further comprises providing information that corresponds to at least one predetermined image standard regarding a view of the vehicle in the environment.

29. The method of claim 24 wherein providing information that corresponds to at least one predetermined image standard regarding the environment of the vehicle with respect to a movable barrier operator further comprises providing information that corresponds to at least one predetermined image standard regarding a view from a vantage point of the vehicle.

30. The method of claim 24 wherein providing information that corresponds to at least one predetermined image standard regarding the environment of the vehicle with respect to a movable barrier operator further comprises storing the information at the movable barrier operator.

31. The method of claim 24 wherein providing information that corresponds to at least one predetermined image standard regarding the environment of the vehicle with respect to a movable barrier operator further comprises storing the information at the movable barrier operator wireless remote control.

32. The method of claim 24 wherein providing information that corresponds to at least one predetermined image standard regarding the environment of the vehicle with respect to a movable barrier operator further comprises modifying an original image regarding the environment of the vehicle with respect to the movable barrier operator.

33. The method of claim 32 wherein modifying an original image regarding the environment of the vehicle with respect to the movable barrier operator further comprises modifying the original image to simulate a specific environmental context and the position of the vehicle in that context.

34. The method of claim 23 wherein providing information that corresponds to at least one predetermined image standard regarding the environment of the vehicle with respect to a movable barrier operator further comprises:

providing first information that corresponds to at least a first predetermined image standard regarding the environment of the vehicle with respect to the movable barrier operator; and providing second information that corresponds to at least a second predetermined image standard regarding the environment of a second vehicle with respect to the movable barrier operator.

35. The method of claim 34 and further comprising correlating the first information with a first identifier and correlating the second information with a second identifier.

36. The method of claim 24 wherein the vehicle comprises a terrestrial vehicle.

37. The method of claim 24 wherein providing information that corresponds to a substantially current image further comprises capturing the substantially current image using an image capture device that is operably coupled to the movable barrier operator.

38. The method of claim 24 wherein providing information that corresponds to a substantially current image further comprises capturing the substantially current image using an image capture device that is operably coupled to the movable barrier operator wireless remote control.

39. The method of claim 24 wherein determining whether at least some information in the substantially current image matches information in the at least one predetermined image standard by at least a predetermined threshold to provide a match detected signal further comprises determining the predetermined threshold as a function, at least in part, of a user manipulable threshold adjustment setting.

40. The method of claim 24 wherein determining whether at least some information in the substantially current image matches information in the at least one predetermined image standard by at least a predetermined threshold to provide a match detected signal further comprises determining whether at least some information in the substantially current image matches information in the at least one predetermined image standard by at least a predetermined percentage to provide a match detected signal.

41. The method of claim 24 wherein determining whether at least some information in the substantially current image matches information in the at least one predetermined image standard by at least a predetermined threshold to provide a match detected signal further comprises:

comparing information regarding a first substantially current image with information regarding a second substantially current image to determine whether the vehicle and movable barrier operator presently appear to be drawing closer to one another.

42. The method of claim 24 wherein providing information that corresponds to at least one predetermined image standard regarding the environment of the vehicle with respect to a movable barrier operator further comprises:

detecting user assertion of a wireless remote control transmit button;

responding to the assertion by capturing an image to provide a captured image; and using the captured image to provide the information that corresponds to the at least one predetermined image standard.

43. The method of claim 24 wherein automatically initiating an action further comprises causing the movable barrier operator wireless remote control to transmit a signal.

44. The method of claim 43 wherein causing the movable barrier operator wireless remote control to transmit a signal further comprises causing the movable barrier operator wireless remote control to transmit a command signal intended for the movable barrier operator.

45. The method of claim 24 wherein automatically initiating an action further comprises:

at the movable barrier operator wireless remote control:

transmitting a first signal;

monitoring for a predetermined response from the movable barrier operator; and upon detecting the predetermined response, transmitting a second signal.

46. The method of claim 45 wherein monitoring for a predetermined response from the movable barrier operator further comprises using an image capture device to monitor for the predetermined response.

47. The method of claim 45 wherein transmitting a second signal further comprises transmitting a movable barrier movement command signal.

48. The method of claim 24 wherein automatically initiating an action further comprises causing the movable barrier operator to automatically initiate movement of a movable barrier.

49. The method of claim 24 wherein automatically initiating an action further comprises causing the movable barrier operator to transmit a signal to the movable barrier operator wireless remote control.

50. The method of claim 49 wherein the signal comprises status information.

51. The method of claim 24 wherein automatically initiating an action further comprises causing the movable barrier operator to automatically operate least a first light in a predetermined manner.

52. The method of claim 24 and further comprising, in the absence of the match detected signal but in the presence of a wireless movable barrier movement remote control signal to the movable barrier operator, automatically storing a substantially current image of the movable object.

53. The method of claim 24 and further comprising determining a time to next provide information that corresponds to a next substantially current image.

54. The method of claim 53 wherein determining a time to next provide information that corresponds to a next substantially current image further comprises determining the time as a function, at least in part, of similarity between at least two previous images.

55. An apparatus comprising:

a movable barrier operator;

a movable barrier operator wireless remote control;

an automatic image recognizer operably coupled to at least one of the movable barrier operator and the movable barrier operator wireless remote control, the automatic image recognizer obtaining at least one image of a vehicle, the at least one image evidencing the presence of the vehicle relative to the moveable barrier operator, the moveable barrier operator responsive to the presence of the vehicle.

56. The apparatus of claim 55 wherein the automatic image recognizer operably couples to the movable barrier operator.

57. The apparatus of claim 55 wherein the automatic image recognizer operably couples to the movable barrier operator wireless remote control.

58. The apparatus of claim 57 wherein at least one of the movable barrier operator and the movable barrier operator wireless remote control further comprises a memory that contains information corresponding to at least one predetermined image standard.

59. The apparatus of claim 55 wherein the automatic image recognizer comprises an image capture device.

60. The apparatus of claim 59 wherein the image capture device comprises a digital image capture device.

61. The apparatus of claim 59 wherein the image capture device is remotely disposed with respect to the movable barrier operator.

62. The apparatus of claim 61 wherein the image capture device is operably coupled to the movable barrier operator by a wireless link.

63. The apparatus of claim 61 wherein the image capture device is operably coupled to the movable barrier operator by a wireline link.

64. The apparatus of claim 59 wherein the image capture device is integrally disposed with respect to the movable barrier operator wireless remote control.

65. The apparatus of claim 59 wherein the image capture device is remotely disposed with respect to the movable barrier operator wireless remote control.

66. The apparatus of claim 65 wherein the image capture device is operably coupled to the movable barrier operator wireless remote control by a wireless link.

67. The apparatus of claim 59 wherein the image capture device comprises a stationary platform.

68. The apparatus of claim 59 wherein the image capture device comprises a movable platform.

69. The apparatus of claim 68 wherein the image capture device is responsive to movement instructions as sourced by the movable barrier operator.

70. The apparatus of claim 59 wherein the automatic image recognizer comprises a plurality of image capture devices.

71. The apparatus of claim 70 wherein at least one of the plurality of image capture devices is operably coupled to the movable barrier operator and another of the plurality of image capture devices is operably coupled to a movable barrier operator wireless remote control.

72. The apparatus of claim 70 wherein at least two of the plurality of image capture devices are each operably coupled to the movable barrier operator.

73. The apparatus of claim 70 wherein at least two of the plurality of image capture devices are each operably coupled to a movable barrier operator wireless remote control.

74. The apparatus of claim 55 wherein the automatic image recognizer further comprises image recognition means for recognizing a substantially current image as matching information that corresponds to a predetermined image standard by at least a predetermined threshold.

75. The apparatus of claim 74 wherein the automatic image recognizer further comprises a user adjustment interface such that a user can modify the predetermined threshold.

76. The apparatus of claim 55 wherein at least one of the movable barrier operator and the movable barrier operator wireless remote control have an image capture user interface such that a user can cause capture of at least one image to be used to facilitate provision of the predetermined image standard.

77. The apparatus of claim 55 wherein the automatic image recognizer comprises a visible light automatic image recognizer.

78. The apparatus of claim 55 wherein the automatic image recognizer comprises a non-visible light automatic image recognizer.

79. A method comprising:

providing information that corresponds to at least one predetermined image standard regarding a presence of a vehicle with respect to a movable barrier operator, the predetermined image standard indicative of whether the vehicle is present relative to the moveable barrier operator;

providing information that corresponds to a substantially current image;

determining whether at least some information in the substantially current image matches information in the at least one predetermined image standard by at least a predetermined threshold to provide a match detected signal; and in response to the match detected signal, automatically initiating an action at least one of a movable barrier operator and a movable barrier operator wireless remote control.

80. The method of claim 79 wherein providing information that corresponds to at least one predetermined image standard regarding the presence of the vehicle with respect to a movable barrier operator further comprises capturing an image and providing the image to the movable barrier operator.

81. The method of claim 79 wherein providing information that corresponds to at least one predetermined image standard regarding the presence of the vehicle with respect to a movable barrier operator further comprises capturing an image and providing the image to the movable barrier operator wireless remote control.

82. The method of claim 79 wherein providing information that corresponds to at least one predetermined image standard regarding the presence of the vehicle with respect to a movable barrier operator further comprises providing information that corresponds to a plurality of predetermined image standards regarding at least one position of the vehicle with respect to a movable barrier operator.

83. The method of claim 79 wherein providing information that corresponds to at least one predetermined image standard regarding the presence of the vehicle with respect to a movable barrier operator further comprises providing information that corresponds to at least one predetermined image standard regarding a view of the vehicle.

84. The method of claim 79 wherein providing information that corresponds to at least one predetermined image standard regarding the presence of the vehicle with respect to a movable barrier operator further comprises providing information that corresponds to at least one predetermined image standard regarding a view from a vantage point of the vehicle.

85. The method of claim 79 wherein providing information that corresponds to at least one predetermined image standard regarding the presence of the vehicle with respect to a movable barrier operator further comprises storing the information at the movable barrier operator.

86. The method of claim 79 wherein providing information that corresponds to at least one predetermined image standard regarding the presence of the vehicle with respect to a movable barrier operator further comprises storing the information at the movable barrier operator wireless remote control.

87. The method of claim 79 wherein providing information that corresponds to at least one predetermined image standard regarding the presence of the vehicle with respect to a movable barrier operator further comprises modifying an original image regarding the presence of the vehicle with respect to the movable barrier operator.

88. The method of claim 87 wherein modifying an original image regarding the presence of the vehicle with respect to the movable barrier operator further comprises modifying the original image to simulate a specific environmental context of the vehicle relative to the moveable barrier operator.

89. The method of claim 79 wherein providing information that corresponds to at least one predetermined image standard regarding the presence of the vehicle with respect to a movable barrier operator further comprises:

providing first information that corresponds to at least a first predetermined image standard regarding the presence of the vehicle with respect to the movable barrier operator; and providing second information that corresponds to at least a second predetermined image standard regarding the presence of a second vehicle with respect to the movable barrier operator.

90. The method of claim 89 and further comprising correlating the first information with a first identifier and correlating the second information with a second identifier.

91. The method of claim 79 wherein the movable object comprises a terrestrial vehicle.

92. The method of claim 79 wherein providing information that corresponds to a substantially current image further comprises capturing the substantially current image using an image capture device that is operably coupled to the movable barrier operator.

93. The method of claim 79 wherein providing information that corresponds to a substantially current image further comprises capturing the substantially current image using an image capture device that is operably coupled to the movable barrier operator wireless remote control.

94. The method of claim 79 wherein determining whether at least some information in the substantially current image matches information in the at least one predetermined image standard by at least a predetermined threshold to provide a match detected signal further comprises determining the predetermined threshold as a function, at least in part, of a user manipulable threshold adjustment setting.

95. The method of claim 79 wherein determining whether at least some information in the substantially current image matches information in the at least one predetermined image standard by at least a predetermined threshold to provide a match detected signal further comprises determining whether at least some information in the substantially current image matches information in the at least one predetermined image standard by at least a predetermined percentage to provide a match detected signal.

96. The method of claim 79 wherein determining whether at least some information in the substantially current image matches information in the at least one predetermined image standard by at least a predetermined threshold to provide a match detected signal further comprises:

comparing information regarding a first substantially current image with information regarding a second substantially current image to determine whether the movable object and movable barrier operator presently appear to be drawing closer to one another.

97. The method of claim 79 wherein providing information that corresponds to at least one predetermined image standard regarding the presence of the vehicle with respect to a movable barrier operator further comprises:

detecting user assertion of a wireless remote control transmit button;

responding to the assertion by capturing an image to provide a captured image; and using the captured image to provide the information that corresponds to the at least one predetermined image standard.

98. The method of claim 79 wherein automatically initiating an action further comprises causing the movable barrier operator wireless remote control to transmit a signal.

99. The method of claim 98 wherein causing the movable barrier operator wireless remote control to transmit a signal further comprises causing the movable barrier operator wireless remote control to transmit a command signal intended for the movable barrier operator.

100. The method of claim 79 wherein automatically initiating an action further comprises:

at the movable barrier operator wireless remote control:

transmitting a first signal;

monitoring for a predetermined response from the movable barrier operator; and upon detecting the predetermined response, transmitting a second signal.

101. The method of claim 100 wherein monitoring for a predetermined response from the movable barrier operator further comprises using an image capture device to monitor for the predetermined response.

102. The method of claim 100 wherein transmitting a second signal further comprises transmitting a movable barrier movement command signal.

103. The method of claim 79 wherein automatically initiating an action further comprises causing the movable barrier operator to automatically initiate movement of a movable barrier.

104. The method of claim 79 wherein automatically initiating an action further comprises causing the movable barrier operator to transmit a signal to the movable barrier operator wireless remote control.

105. The method of claim 104 wherein the signal comprises status information.

106. The method of claim 79 wherein automatically initiating an action further comprises causing the movable barrier operator to automatically operate least a first light in a predetermined manner.

107. The method of claim 79 and further comprising, in the absence of the match detected signal but in the presence of a wireless movable barrier movement remote control signal to the movable barrier operator, automatically storing a substantially current image of the movable object.

108. The method of claim 79 and further comprising determining a time to next provide information that corresponds to a next substantially current image.

109. The method of claim 108 wherein determining a time to next provide information that corresponds to a next substantially current image further comprises determining the time as a function, at least in part, of similarity between at least two previous images.

* * * * *

UNITED STATES PATENT AND TRADEMARK OFFICE

CERTIFICATE OF CORRECTION

PATENT NO. : 7,345,574 B2
APPLICATION NO. : 10/767184
DATED : March 18, 2008
INVENTOR(S) : James J. Fitzgibbon It is certified that error appears in the above-identified patent and that said Letters Patent is hereby corrected as shown below:

Column 13, Line 4, Claim 34: Change “Claim 23” to -- Claim 24 --;

Column 14, Line 36, Claim 51: After “operate” insert -- at --; and

Column 18, Line 48, Claim 106: After “operate” insert -- at --.

Signed and Sealed this

Twenty-second Day of July, 2008

JON W. DUDAS
*Director of the United States Patent and Trademark Office*